United States Patent
Taylor et al.

(10) Patent No.: US 10,692,174 B2
(45) Date of Patent: Jun. 23, 2020

(54) COURSE PROFILING AND SHARING

(71) Applicant: SONY INTERACTIVE ENTERTAINMENT INC., Tokyo (JP)

(72) Inventors: Michael Taylor, San Mateo, CA (US); Dennis Dale Castleman, Fremont, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/728,833

(22) Filed: Dec. 27, 2019

(65) Prior Publication Data
US 2020/0134781 A1    Apr. 30, 2020

Related U.S. Application Data

(63) Continuation of application No. 16/526,819, filed on Jul. 30, 2019, now Pat. No. 10,540,746, which is a
(Continued)

(51) Int. Cl.
*G06T 3/40* (2006.01)
*G06T 17/05* (2011.01)
*G06T 7/70* (2017.01)

(52) U.S. Cl.
CPC .......... *G06T 3/40* (2013.01); *G06T 7/70* (2017.01); *G06T 17/05* (2013.01); *G06T 2207/10032* (2013.01); *G06T 2207/30241* (2013.01)

(58) Field of Classification Search
CPC .. G06T 3/40; G06T 7/70; G06T 17/00; G06T 17/05; B64C 39/024; B64C 2201/127; B64C 2201/146; B64C 2201/141; B64C 2201/00; B64C 2201/021–028; B64C 2201/123; G05D 1/0044; G05D 1/0016;
(Continued)

(56) References Cited

U.S. PATENT DOCUMENTS 3,279,863 A   10/1966   Zuppiger
3,367,658 A   2/1968    Bayha
(Continued)

FOREIGN PATENT DOCUMENTS

WO   WO 2018/063594   4/2018

OTHER PUBLICATIONS

Bai, Z., Blackwell, A., Coulouris, G.; Using augmented reality to elicit pretend play for children with autism. IEEE Transactions on Visualization & Computer Graphics. May 1, 2015(1):1.
Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.
(Continued)

*Primary Examiner* — Michael S Osinski
(74) *Attorney, Agent, or Firm* — Polsinelli LLP (57) ABSTRACT

Systems and methods for unmanned aerial vehicle (UAV) course profiling are provided. A plurality of images may be captured by a UAV flying along a course at a first location. A profile may be constructed for the course based on the images captured by the UAV. The constructed course profile is transmitted over a communication network to a virtual reality system at a second location. The virtual reality system may generate a virtual environment corresponding to the course based on the constructed course profile, and a second UAV at the second location may fly along the virtual course.

17 Claims, 6 Drawing Sheets

Related U.S. Application Data continuation of application No. 15/394,511, filed on Dec. 29, 2016, now Pat. No. 10,410,320.

(60) Provisional application No. 62/402,584, filed on Sep. 30, 2016.

(58) Field of Classification Search
CPC ............... G05D 1/0038; G05D 1/0246; G05D 1/0251–0253
See application file for complete search history.

(56) References Cited

U.S. PATENT DOCUMENTS

| | | | |
|---|---|---|---|
| 6,021,646 | A | 2/2000 | Burley et al. |
| 6,075,924 | A | 6/2000 | Will |
| 6,236,365 | B1 | 5/2001 | LeBlanc et al. |
| 6,254,394 | B1 | 7/2001 | Draper et al. |
| 7,912,742 | B2 | 3/2011 | Trautman |
| 7,975,774 | B2 | 7/2011 | Akcasu |
| 7,988,154 | B1 | 8/2011 | Regan, Jr. |
| 8,025,293 | B1 | 9/2011 | Crawford et al. |
| 8,909,391 | B1 | 12/2014 | Peeters et al. |
| 9,061,102 | B2 | 6/2015 | Levien et al. |
| 9,218,316 | B2 | 12/2015 | Bernstein et al. |
| 9,442,485 | B1 | 9/2016 | McDermott et al. |
| 9,605,926 | B1 | 3/2017 | Means et al. |
| 9,632,502 | B1 | 4/2017 | Levinson et al. |
| 9,927,812 | B2 | 3/2018 | Wang et al. |
| 10,062,292 | B2 | 8/2018 | Blomberg et al. |
| 10,067,736 | B2 | 9/2018 | Taylor et al. |
| 10,137,984 | B1 | 11/2018 | Flick |
| 10,210,905 | B2 | 2/2019 | Castleman |
| 10,248,118 | B2 | 4/2019 | Bernstein et al. |
| 10,336,469 | B2 | 7/2019 | Mallinson |
| 10,357,709 | B2 | 7/2019 | Mallinson |
| 10,377,484 | B2 | 8/2019 | Taylor |
| 10,410,320 | B2 | 9/2019 | Taylor |
| 10,416,669 | B2 | 9/2019 | Rico |
| 10,500,487 | B2* | 12/2019 | Gutierrez ............... A63F 13/245 |
| 10,540,746 | B2 | 1/2020 | Taylor |
| 2003/0102016 | A1 | 6/2003 | Bouchard |
| 2003/0152892 | A1 | 8/2003 | Huang et al. |
| 2004/0008253 | A1 | 1/2004 | Monroe |
| 2004/0115593 | A1 | 6/2004 | Hatlestad et al. |
| 2004/0172187 | A1 | 9/2004 | Wiseman |
| 2005/0004723 | A1 | 1/2005 | Duggan et al. |
| 2005/0283281 | A1 | 12/2005 | Hartmann et al. |
| 2006/0095262 | A1 | 5/2006 | Danielli |
| 2006/0169508 | A1 | 8/2006 | Trojahn |
| 2007/0061116 | A1 | 3/2007 | Bush |
| 2007/0102876 | A1 | 5/2007 | Giegerich et al. |
| 2007/0130599 | A1 | 6/2007 | Monroe |
| 2008/0073839 | A1 | 3/2008 | Nally |
| 2008/0093796 | A1 | 4/2008 | Narus et al. |
| 2008/0144884 | A1 | 6/2008 | Habibi |
| 2008/0154447 | A1 | 6/2008 | Spinelli |
| 2008/0177994 | A1 | 7/2008 | Mayer |
| 2008/0221745 | A1 | 9/2008 | Diamandis et al. |
| 2008/0232602 | A1 | 9/2008 | Shearer |
| 2008/0240448 | A1 | 10/2008 | Gustafsson et al. |
| 2009/0005167 | A1 | 1/2009 | Arrasvuori et al. |
| 2009/0076665 | A1 | 3/2009 | Hoisington et al. |
| 2009/0087029 | A1 | 4/2009 | Coleman et al. |
| 2009/0118896 | A1 | 5/2009 | Gustafsson |
| 2009/0125163 | A1 | 5/2009 | Duggan et al. |
| 2009/0187389 | A1 | 7/2009 | Dobbins et al. |
| 2009/0265105 | A1 | 10/2009 | Davis et al. |
| 2010/0083038 | A1 | 4/2010 | Pierce et al. |
| 2010/0096491 | A1 | 4/2010 | Whitelaw et al. |
| 2010/0121574 | A1 | 5/2010 | Ariyur et al. |
| 2010/0228468 | A1 | 9/2010 | D'Angelo |
| 2010/0305724 | A1 | 12/2010 | Fry et al. |
| 2011/0102459 | A1 | 5/2011 | Hall |
| 2011/0106339 | A1 | 5/2011 | Phillips et al. |
| 2011/0184590 | A1 | 7/2011 | Duggan et al. |
| 2011/0199376 | A1 | 8/2011 | Salemane |
| 2011/0311949 | A1 | 12/2011 | Preston et al. |
| 2012/0009845 | A1 | 1/2012 | Schmelzer |
| 2012/0035799 | A1 | 2/2012 | Ehrmann |
| 2012/0093320 | A1 | 4/2012 | Flaks et al. |
| 2012/0188078 | A1 | 7/2012 | Soles et al. |
| 2012/0206452 | A1 | 8/2012 | Geisner et al. |
| 2012/0212399 | A1 | 8/2012 | Border et al. |
| 2012/0232867 | A1 | 9/2012 | Ahrens et al. |
| 2013/0128054 | A1 | 5/2013 | Densham et al. |
| 2013/0137066 | A1 | 5/2013 | Pollak et al. |
| 2013/0173089 | A1 | 7/2013 | Bernstein et al. |
| 2013/0328927 | A1 | 12/2013 | Mount et al. |
| 2013/0345910 | A1 | 12/2013 | Kerho et al. |
| 2014/0018979 | A1* | 1/2014 | Goossen ............... G08G 5/0034 701/3 |
| 2014/0244075 | A1 | 8/2014 | Litwinowicz et al. |
| 2014/0316616 | A1 | 10/2014 | Kugelmass |
| 2014/0324253 | A1 | 10/2014 | Duggan et al. |
| 2014/0356670 | A1 | 12/2014 | Haug et al. |
| 2015/0063610 | A1 | 3/2015 | Mossner |
| 2015/0135144 | A1* | 5/2015 | Kim ........................... G06F 3/14 715/850 |
| 2015/0141100 | A1 | 5/2015 | Carter |
| 2015/0209659 | A1 | 7/2015 | Barr et al. |
| 2015/0248785 | A1 | 9/2015 | Holmquist |
| 2015/0323931 | A1 | 11/2015 | Downey et al. |
| 2015/0346722 | A1 | 12/2015 | Herz et al. |
| 2015/0370250 | A1 | 12/2015 | Bachrach et al. |
| 2015/0378019 | A1 | 12/2015 | Schissler et al. |
| 2016/0035224 | A1 | 2/2016 | Yang et al. |
| 2016/0078759 | A1 | 3/2016 | Nerayoff et al. |
| 2016/0082597 | A1* | 3/2016 | Gorshechnikov ........ G06N 5/02 700/253 |
| 2016/0091894 | A1 | 3/2016 | Zhang et al. |
| 2016/0111006 | A1 | 4/2016 | Srivastava et al. |
| 2016/0117853 | A1 | 4/2016 | Zhong et al. |
| 2016/0117931 | A1 | 4/2016 | Chan et al. |
| 2016/0144734 | A1 | 5/2016 | Wang et al. |
| 2016/0196754 | A1 | 7/2016 | Surace |
| 2016/0205654 | A1 | 7/2016 | Robinson |
| 2016/0217698 | A1 | 7/2016 | Liu et al. |
| 2016/0246474 | A1* | 8/2016 | Shuster ................... A63F 13/12 |
| 2016/0253908 | A1 | 9/2016 | Chambers et al. |
| 2016/0257001 | A1 | 9/2016 | Blasdel et al. |
| 2016/0284125 | A1 | 9/2016 | Bostick et al. |
| 2016/0291593 | A1 | 10/2016 | Hammond et al. |
| 2016/0292924 | A1* | 10/2016 | Balachandreswaran ...... A63F 13/212 |
| 2016/0299506 | A1 | 10/2016 | Bruggeman et al. |
| 2016/0307447 | A1 | 10/2016 | Johnson et al. |
| 2016/0327950 | A1 | 11/2016 | Bachrach et al. |
| 2016/0330601 | A1 | 11/2016 | Srivastava |
| 2016/0358497 | A1 | 12/2016 | Nguyen et al. |
| 2017/0036771 | A1 | 2/2017 | Woodman et al. |
| 2017/0039859 | A1 | 2/2017 | Hu et al. |
| 2017/0045886 | A1 | 2/2017 | Liu et al. |
| 2017/0053169 | A1 | 2/2017 | Cuban et al. |
| 2017/0061813 | A1 | 3/2017 | Tao et al. |
| 2017/0069214 | A1 | 3/2017 | Dupray et al. |
| 2017/0098947 | A1 | 4/2017 | Wolski |
| 2017/0116723 | A1 | 4/2017 | Aughey |
| 2017/0158353 | A1 | 6/2017 | Schmick |
| 2017/0165575 | A1 | 6/2017 | Ridihalgh et al. |
| 2017/0166204 | A1 | 6/2017 | Yoo et al. |
| 2017/0168488 | A1 | 6/2017 | Wierzynski et al. |
| 2017/0168556 | A1 | 6/2017 | Goslin et al. |
| 2017/0173451 | A1 | 6/2017 | Pedersen et al. |
| 2017/0182407 | A1 | 6/2017 | Steele et al. |
| 2017/0244775 | A1* | 8/2017 | Ha ........................ G06T 19/006 |
| 2017/0251323 | A1 | 8/2017 | Jo et al. |
| 2017/0283090 | A1 | 10/2017 | Miller et al. |
| 2017/0295446 | A1 | 10/2017 | Thagadur |
| 2017/0329347 | A1 | 11/2017 | Passot et al. |
| 2017/0337826 | A1 | 11/2017 | Moran et al. |
| 2017/0343375 | A1 | 11/2017 | Kamhi et al. |
| 2017/0371353 | A1 | 12/2017 | Millinger |
| 2017/0372617 | A1 | 12/2017 | Bruno et al. |
| 2018/0322699 | A1 | 1/2018 | Gray et al. |

(56) References Cited

U.S. PATENT DOCUMENTS

| | | | |
|---|---|---|---|
| 2018/0027772 A1* | 2/2018 | Gordon | A01K 15/023 |
| 2018/0032071 A1 | 2/2018 | Wieneke | |
| 2018/0039262 A1 | 2/2018 | Fox et al. | |
| 2018/0046187 A1 | 2/2018 | Martirosyan et al. | |
| 2018/0046560 A1 | 2/2018 | Gillies et al. | |
| 2018/0093171 A1 | 4/2018 | Mallinson | |
| 2018/0093768 A1 | 4/2018 | Castleman | |
| 2018/0093781 A1 | 4/2018 | Mallinson | |
| 2018/0094931 A1 | 4/2018 | Taylor | |
| 2018/0095433 A1 | 4/2018 | Rico | |
| 2018/0095461 A1 | 4/2018 | Taylor | |
| 2018/0095463 A1 | 4/2018 | Castleman | |
| 2018/0095714 A1 | 4/2018 | Taylor | |
| 2018/0096455 A1 | 4/2018 | Taylor | |
| 2018/0096611 A1 | 4/2018 | Kikuchi | |
| 2018/0098052 A1 | 4/2018 | Black | |
| 2018/0144525 A1* | 5/2018 | Gutierrez | G06T 19/003 |
| 2018/0213359 A1* | 7/2018 | Reinhardt | G06F 3/011 |
| 2018/0246514 A1 | 8/2018 | Mitomo et al. | |
| 2018/0259339 A1 | 9/2018 | Johnson et al. | |
| 2018/0321692 A1 | 11/2018 | Castillo-Effen et al. | |
| 2018/0329413 A1 | 11/2018 | Charalambides et al. | |
| 2019/0156563 A1* | 5/2019 | Wada | G06T 7/70 |
| 2019/0156573 A1* | 5/2019 | Palos | G06T 19/003 |
| 2019/0311548 A1* | 10/2019 | Wang | G06T 19/20 |

OTHER PUBLICATIONS

Thon S, Serena-Allier D, Salvetat C, Lacotte F.; "Flying a drone in a museum an augmented-reality serious game in a Provence", InDigital Heritage International Congress (DigitalHeritage), Oct. 28, 2013 (vol. 2, pp. 669-676), IEEE. (Year: 2013).

Williams, Elliot; "Real-life Space Invaders with Drones and Lasers," Hackday, Sep. 19, 2016.

PCT Application No. PCT/US2017/048064 International Search Report and Written Opinion dated Nov. 7, 2017.

PCT Application No. PCT/US2017/048064 International Preliminary Report on Patentability dated Apr. 2, 2019.

U.S. Appl. No. 15/394,473 Office Action dated Jun. 10, 2019.

U.S. Appl. No. 15/394,391 Office Action dated Aug. 24, 2018.

U.S. Appl. No. 15/394,391 Office Action dated Feb. 23, 2018.

U.S. Appl. No. 15/394,329 Final Office Action dated FFeb. 25, 2019.

U.S. Appl. No. 15/394,329 Office Action dated Aug. 7, 2018.

U.S. Appl. No. 15/394,267 Final Office Action dated Apr. 19, 2019.

U.S. Appl. No. 15/394,267 Office Action dated Aug. 24, 2018.

U.S. Appl. No. 15/394,285 Office Action dated Jan. 8, 2020.

U.S. Appl. No. 15/394,285 Final Office Action dated Feb. 26, 2019.

U.S. Appl. No. 15/394,285 Office Action dated Aug. 3, 2018.

U.S. Appl. No. 15/394,313 Office Action dated Oct. 18, 2017.

U.S. Appl. No. 16/121,441 Final Office Action dated Sep. 6, 2019.

U.S. Appl. No. 16/121,441 Office Action dated May 15, 2019.

U.S. Appl. No. 15/393,855 Final Office Action dated May 17, 2019.

U.S. Appl. No. 15/393,855 Office Action dated Feb. 1, 2019.

U.S. Appl. No. 15/393,855 Final Office Action dated Oct. 12, 2018.

U.S. Appl. No. 15/393,855 Office Action dated May 16, 2018.

U.S. Appl. No. 15/711,695 Office Action dated Oct. 5, 2018.

U.S. Appl. No. 15/711,961 Office Action dated Oct. 5, 2018.

U.S. Appl. No. 16/121,441 Office Action dated Feb. 19, 2020.

* cited by examiner

FIG. 8

COURSE PROFILING AND SHARING

CROSS-REFERENCE TO RELATED APPLICATIONS

The present application is a continuation and claims the priority benefit of U.S. patent application Ser. No. 16/526,819 filed Jul. 30, 2019, which is a continuation and claims the priority benefit of Ser. No. 15/394,511 filed Dec. 29, 2016, now U.S. Pat. No. 10,410,320, which claims the priority benefit of U.S. provisional patent application 62/402,584 filed on Sep. 30, 2016, the disclosures of which are incorporated herein by reference.

BACKGROUND OF THE INVENTION

1. Field of the Invention

The present invention generally relates to unmanned aerial vehicles (UAVs). More specifically, the present invention relates to course profiling and sharing by UAVs.

2. Description of the Related Art

An unmanned aerial vehicle (UAV)—also commonly called a drone—is a type of aircraft that may be controlled with varying degrees of autonomy or direction by a remote human pilot. UAVs are available in a variety of different sizes, configurations, power, maneuverability, and peripheral devices, such as cameras, sensors, radar, sonar, etc. Common uses for UAVs include aerial photography, surveillance, and delivery of a variety of payloads, as well as recreational and hobby usage.

Figure 1:
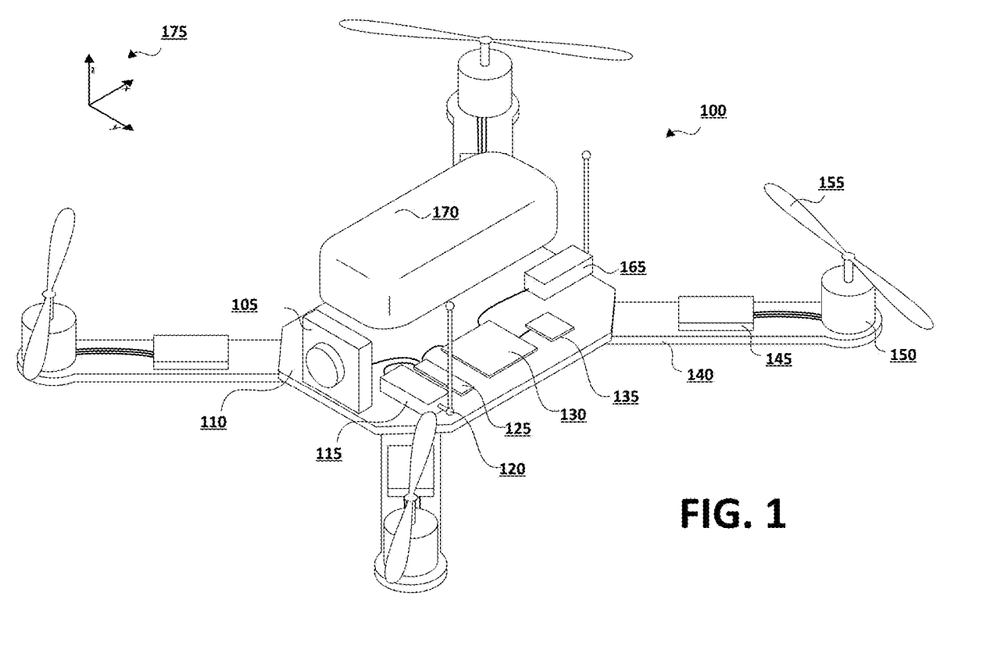
FIG. 1 illustrates an exemplary unmanned aerial vehicle (UAV) that may be used in implementations of the present invention.

FIG. 1 illustrates an exemplary unmanned aerial vehicle (UAV) 100. As noted above, UAVs may be used to surveil and capture images of a location. A UAV may be flown, for example, over and around a location while an onboard camera or other type of sensor gathers or captures data (e.g., images, measurements) regarding the location. Such information may be used to construct a map or other type of illustrative diagram regarding the conditions at the location. Such mapping may use a variety of information captured by any combination of cameras or other type of sensors carried by the UAV, as well as use algorithms for simultaneous localization and mapping (SLAM), photometry, light detection and ranging (LiDAR), and other cartographic or topographic data analysis.

In a recreational context, UAVs may be flown in a variety of races or other types of UAV competitions. Such races and competitions have generally required competitors and their respective drones to compete at the same physical location (e.g., a race course or obstacle course) so that the competitors may face the same conditions and challenges. The requirement that the competitors be in the same location may limit, however, the number of competitors who may fly the course within a reasonable timeframe, as well as add a layer of difficulty and expense to the hobby. Recreating the same conditions across multiple venues in different locations may be difficult, expensive, and impractical.

There is, therefore, a need in the art for improved systems and methods for UAV course profiling and sharing.

SUMMARY OF THE CLAIMED INVENTION

Embodiments of the present invention allow unmanned aerial vehicle (UAV) course profiling. A plurality of images may be captured by a UAV flying along a course at a first location. A profile may be constructed for the course based on the images captured by the UAV. In some instances, the course profile may further include virtual elements generated by a virtual reality system at the first location. The constructed course profile is transmitted over a communication network to a virtual reality system at a second location. The virtual reality system may generate a virtual environment corresponding to the course based on the constructed course profile, and a second UAV at the second location may fly along the virtual course.

Various embodiments of the present invention may include systems for UAV course profiling. Such systems may include an unmanned aerial vehicle (UAV) that captures a plurality of images while flying along a course at a first location, a processor that executes instructions stored in memory to construct a profile for the course based on the images captured by the UAV, and a network interface that transmits the constructed course profile over a communication network to a virtual reality system at a second location. The virtual reality system may generate a virtual environment corresponding to the course based on the constructed course profile.

Additional embodiments of the present invention may further include methods for unmanned aerial vehicle (UAV) course profiling. Such methods may include capturing a plurality of images by a UAV flying along a course at a first location, executing instructions stored in memory to construct a profile for the course based on the images captured by the UAV while flying along the course, and transmitting the constructed course profile over a communication network to a virtual reality system at a second location. The virtual reality system may generate a virtual environment corresponding to the course based on the constructed course profile.

Further embodiments of the present invention may further include non-transitory computer-readable storage media, having embodied thereon a program executable by a processor to perform methods for unmanned aerial vehicle (UAV) course profiling as described herein.

DETAILED DESCRIPTION

Embodiments of the present invention allow unmanned aerial vehicle (UAV) course profiling. A plurality of images may be captured by a UAV flying along a course at a first location. A profile may be constructed for the course based on the images captured by the UAV. In some instances, the course profile may further include virtual elements generated by a virtual reality system at the first location. The constructed course profile is transmitted over a communication network to a virtual reality system at a second location. The virtual reality system may generate a virtual environment corresponding to the course based on the constructed course profile, and a second UAV at the second location may fly along the virtual course.

FIG. 1 illustrates an exemplary unmanned aerial vehicle (UAV) that may be used in implementations of the present invention. In some embodiments, UAV 100 has main body 110 with one or more arms 140. The proximal end of arm 140 can attach to main body 110 while the distal end of arm 140 can secure motor 150. Arms 140 can be secured to main body 110 in an "X" configuration, an "H" configuration, a "T" configuration, or any other configuration as appropriate. The number of motors 150 can vary, for example there can be three motors 150 (e.g., a "tricopter"), four motors 150 (e.g., a "quadcopter"), eight motors (e.g., an "octocopter"), etc.

In some embodiments, each motor 155 rotates (e.g., the drive shaft of motor 155 spins) about parallel axes. For example, the thrust provided by all propellers 155 can be in the Z direction. Alternatively, a motor 155 can rotate about an axis that is perpendicular (or any angle that is not parallel) to the axis of rotation of another motor 155. For example, two motors 155 can be oriented to provide thrust in the Z direction (e.g., to be used in takeoff and landing) while two motors 155 can be oriented to provide thrust in the X direction (e.g., for normal flight). In some embodiments, UAV 100 can dynamically adjust the orientation of one or more of its motors 150 for vectored thrust.

In some embodiments, the rotation of motors 150 can be configured to create or minimize gyroscopic forces. For example, if there are an even number of motors 150, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 150 (e.g., those that rotate clockwise) while providing less power to the remaining motors (e.g., those that rotate counter-clockwise).

Motors 150 can be any combination of electric motors, internal combustion engines, turbines, rockets, etc. In some embodiments, a single motor 150 can drive multiple thrust components (e.g., propellers 155) on different parts of UAV 100 using chains, cables, gear assemblies, hydraulics, tubing (e.g., to guide an exhaust stream used for thrust), etc. to transfer the power.

In some embodiments, motor 150 is a brushless motor and can be connected to electronic speed controller X45. Electronic speed controller 145 can determine the orientation of magnets attached to a drive shaft within motor 150 and, based on the orientation, power electromagnets within motor 150. For example, electronic speed controller 145 can have three wires connected to motor 150, and electronic speed controller 145 can provide three phases of power to the electromagnets to spin the drive shaft in motor 150. Electronic speed controller 145 can determine the orientation of the drive shaft based on back-emf on the wires or by directly sensing to position of the drive shaft.

Transceiver 165 can receive control signals from a control unit (e.g., a handheld control transmitter, a server, etc.). Transceiver 165 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 165 can also transmit data to a control unit. Transceiver 165 can communicate with the control unit using lasers, light, ultrasonic, infra-red, Bluetooth, 802.11x, or similar communication methods, including a combination of methods. Transceiver can communicate with multiple control units at a time.

Position sensor 135 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 135 can include a land-speed sensor, an air-speed sensor, a celestial navigation sensor, etc.

UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 135 and environmental awareness sensors can all be one unit or a collection of units. In some embodiments, some features of position sensor 135 and/or the environmental awareness sensors are embedded within flight controller 130.

In some embodiments, an environmental awareness system can take inputs from position sensors 135, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 105 can include an image sensor (e.g., a CCD sensor, a CMOS sensor, etc.), a lens system, a processor, etc. The lens system can include multiple movable lenses that can be adjusted to manipulate the focal length and/or field of view (e.g., zoom) of the lens system. In some embodiments, camera 105 is part of a camera system which includes multiple cameras 105. For example, two cameras 105 can be used for stereoscopic imaging (e.g., for first person video, augmented reality, etc.). Another example includes one camera 105 that is optimized for detecting hue and saturation information and a second camera 105 that is optimized for detecting intensity information. In some embodiments, camera 105 optimized for low latency is used for control systems while a camera 105 optimized for quality is used for recording a video (e.g., a cinematic video). Camera 105 can be a visual light camera, an infrared camera, a depth camera, etc.

A gimbal and dampeners can help stabilize camera 105 and remove erratic rotations and translations of UAV 100.

For example, a three-axis gimbal can have three stepper motors that are positioned based on a gyroscope reading in order to prevent erratic spinning and/or keep camera 105 level with the ground.

Video processor 125 can process a video signal from camera 105. For example video process 125 can enhance the image of the video signal, down-sample or up-sample the resolution of the video signal, add audio (captured by a microphone) to the video signal, overlay information (e.g., flight data from flight controller 130 and/or position sensor), convert the signal between forms or formats, etc.

Video transmitter 120 can receive a video signal from video processor 125 and transmit it using an attached antenna. The antenna can be a cloverleaf antenna or a linear antenna. In some embodiments, video transmitter 120 uses a different frequency or band than transceiver 165. In some embodiments, video transmitter 120 and transceiver 165 are part of a single transceiver.

Battery 170 can supply power to the components of UAV 100. A battery elimination circuit can convert the voltage from battery 170 to a desired voltage (e.g., convert 12v from battery 170 to 5v for flight controller 130). A battery elimination circuit can also filter the power in order to minimize noise in the power lines (e.g., to prevent interference in transceiver 165 and transceiver 120). Electronic speed controller 145 can contain a battery elimination circuit. For example, battery 170 can supply 12 volts to electronic speed controller 145 which can then provide 5 volts to flight controller 130. In some embodiments, a power distribution board can allow each electronic speed controller (and other devices) to connect directly to the battery.

In some embodiments, battery 170 is a multi-cell (e.g., 2S, 3S, 4S, etc.) lithium polymer battery. Battery 170 can also be a lithium-ion, lead-acid, nickel-cadmium, or alkaline battery. Other battery types and variants can be used as known in the art. Additional or alternative to battery 170, other energy sources can be used. For example, UAV 100 can use solar panels, wireless power transfer, a tethered power cable (e.g., from a ground station or another UAV 100), etc. In some embodiments, the other energy source can be utilized to charge battery 170 while in flight or on the ground.

Battery 170 can be securely mounted to main body 110. Alternatively, battery 170 can have a release mechanism. In some embodiments, battery 170 can be automatically replaced. For example, UAV 100 can land on a docking station and the docking station can automatically remove a discharged battery 170 and insert a charged battery 170. In some embodiments, UAV 100 can pass through docking station and replace battery 170 without stopping.

Battery 170 can include a temperature sensor for overload prevention. For example, when charging, the rate of charge can be thermally limited (the rate will decrease if the temperature exceeds a certain threshold). Similarly, the power delivery at electronic speed controllers 145 can be thermally limited—providing less power when the temperature exceeds a certain threshold. Battery 170 can include a charging and voltage protection circuit to safely charge battery 170 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 130 can communicate with electronic speed controller 145, battery 170, transceiver 165, video processor 125, position sensor 135, and/or any other component of UAV 100. In some embodiments, flight controller 130 can receive various inputs (including historical data) and calculate current flight characteristics. Flight characteristics can include an actual or predicted position, orientation, velocity, angular momentum, acceleration, battery capacity, temperature, etc. of UAV 100. Flight controller 130 can then take the control signals from transceiver 165 and calculate target flight characteristics. For example, target flight characteristics might include "rotate x degrees" or "go to this GPS location". Flight controller 130 can calculate response characteristics of UAV 100. Response characteristics can include how electronic speed controller 145, motor 150, propeller 155, etc. respond, or are expected to respond, to control signals from flight controller 130. Response characteristics can include an expectation for how UAV 100 as a system will respond to control signals from flight controller 130. For example, response characteristics can include a determination that one motor 150 is slightly weaker than other motors.

After calculating current flight characteristics, target flight characteristics, and response characteristics flight controller 130 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 130 are performed by a system external to UAV 100. For example, current flight characteristics can be sent to a server that returns the optimized control signals. Flight controller 130 can send the optimized control signals to electronic speed controllers 145 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to "tag" another UAV 100.

Figure 2:
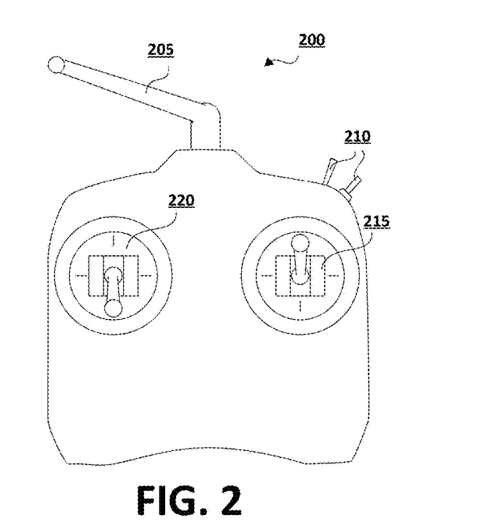
FIG. 2 illustrates an exemplary control transmitter used to control a UAV that may be used in implementations of the present invention.

FIG. 2 illustrates an exemplary control transmitter 200 used to control a UAV that may be used in implementations of the present invention. Control transmitter 200 can send control signals to transceiver 165. Control transmitter can have auxiliary switches 210, joysticks 215 and 220, and antenna 205. Joystick 215 can be configured to send elevator and aileron control signals while joystick 220 can be configured to send throttle and rudder control signals (this is termed a mode 2 configuration). Alternatively, joystick 215 can be configured to send throttle and aileron control signals while joystick 220 can be configured to send elevator and rudder control signals (this is termed a mode 1 configuration). Auxiliary switches 210 can be configured to set options on control transmitter 200 or UAV 100. In some embodiments, control transmitter 200 receives information from a transceiver on UAV 100. For example, it can receive some current flight characteristics from UAV 100.

Figure 3:
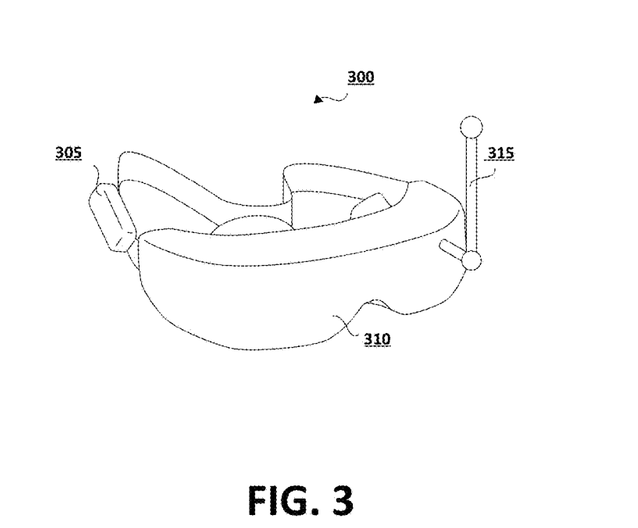
FIG. 3 illustrates an exemplary virtual reality system headset that may be used in implementations of the present invention.

FIG. 3 illustrates an exemplary virtual reality system 300 that may be used in implementations of the present invention. Virtual reality system 300 may include battery 305 or another power source, display screen 310, and receiver 315. Virtual reality system 300 can receive a data stream (e.g., video) from transmitter 120 of UAV 100. Virtual reality system 300 may include a head-mounted unit as depicted in FIG. 3. Virtual reality system 300 can also include a monitor, projector, or a plurality of additional head-mounted units such that multiple viewers can view the same virtual environment.

Virtual reality system 300 may generate a display of an artificial image to overlay the view of the real world (e.g., augmented reality) or to create an independent reality all its own. Display screen 310 may be partly transparent or translucent, thereby allowing the user to observe real-world surroundings, as well as a displayed computer generated image, or a combination of the two. The virtual environment generated by virtual reality system 300 and presented to the user may include any of the real-world surroundings, any physical objects (which may be augmented or not), or generate wholly virtual objects.

In some embodiments, display screen 310 includes two screens, one for each eye; these screens can have separate signals for stereoscopic viewing. In some embodiments, receiver 315 may be coupled to display screen 310 (as shown in FIG. 3). Alternatively, receiver 315 can be a separate unit that is connected using a wire to virtual reality system 300. In some embodiments, virtual reality system 300 is coupled to control transmitter 200. Virtual reality system 300 may further be communicatively coupled to a computing device (not pictured) such as those illustrated in and described with respect to FIGS. 7 and 8.

Figure 4A:
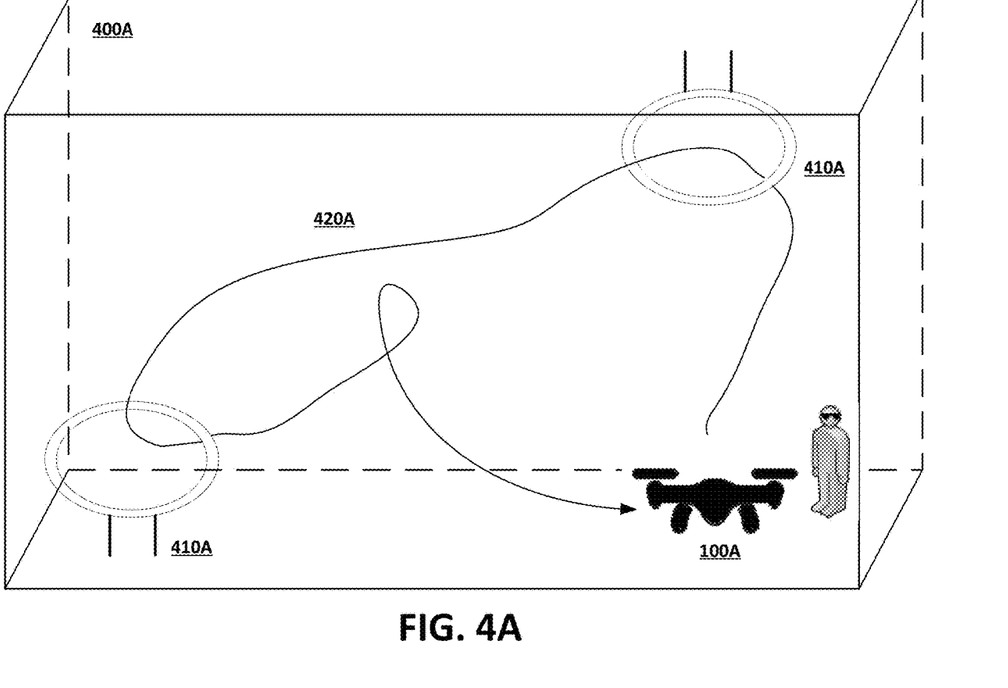
FIG. 4A illustrates an exemplary physical space within which a UAV may be flown along a course.

FIG. 4A illustrates an exemplary physical space 400A within which a UAV 100A may be flown along a course 420A. As illustrated, the physical space 400A may include a variety of course elements 410A, which may be a physical object or may only exist as virtual objects generated by a virtual reality system (e.g., virtual reality system 300). In some embodiments, the course elements 410A may have both physical and virtual features. For example, a course element 410A may have a physical structure and shape to which the virtual reality system 300 may add decorative, thematic, or other visual features in generating the virtual environment corresponding to the course.

A user or pilot may fly UAV 100A along course 420A, thereby navigating through or around the various course elements 410A placed along course 420A. The user may plot the course 420A anywhere within the space 400A. Course 420A may include, for example, maneuvering through or around certain course elements 410A, as well as various maneuvers in open space within space 400A.

The user may view the UAV from his or her physical location within the virtual environment while flying the UAV along the course 420A. Depending on settings of the virtual reality system 300, the user may also be provided with a first person view of the course 420A corresponding to the view as seen from the UAV. The virtual reality system 300 therefore provides the user with a flight simulation experience corresponding to the actual physical flight of the UAV.

While UAV 100A is flying along course 420A, its cameras and sensors may be capturing images and various other details regarding the physical space 400A (e.g., size or dimensional measurements) and the course 420A (e.g., various obstacles, such as walls, and course elements 410A). Using the various positional sensors discussed above with respect to FIG. 1, information regarding the positions and movement of the UAV through space 400A along course 420A may be ascertained. The images and other data captured regarding physical space 400A—in conjunction with the locations of the UAV moving through that space 400A—allows for construction of a course profile or map.

Such a course profile may include not only physical structures (e.g., walls of space 400A), but virtual structures as well. The virtual structures may be generated by a virtual reality system 300 based on user preferences and input. For example, the physical space 400A may be an empty room shaped as a simple rectangular prism in which course elements 410A may be added, whether as physical or virtual objects. In addition, the virtual reality system 300 may further add another layer of imagery where the walls of the space 400A may be made to appear as walls of an underground cave and the course elements 410A as narrow tunnel openings. Alternatively, the walls of space 400A may be made to look like outer space and the course elements 410A as openings between asteroids. Such virtual features may also be included in the course profile constructed for course 420A.

Figure 4B:
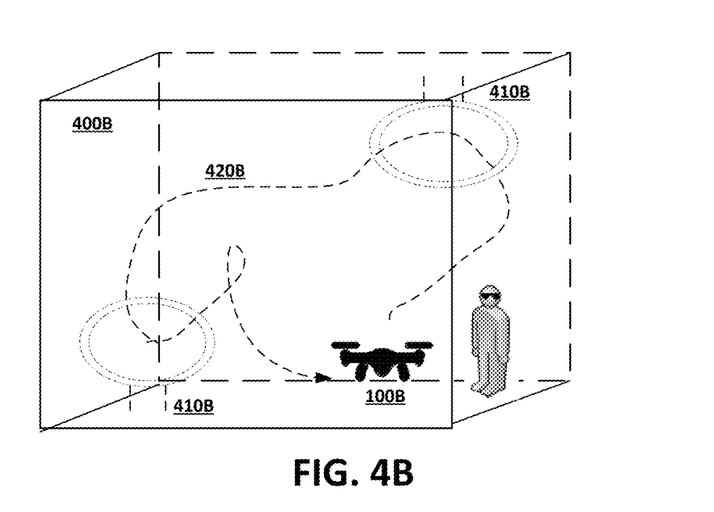
FIG. 4B illustrates a physical space different from that illustrated in FIG. 4A, but within which the course of FIG. 4A may be recreated by a virtual reality system.

FIG. 4B illustrates a physical space 400B that is different from that illustrated in FIG. 4A, but within which the course 420A of FIG. 4A may be recreated by a virtual reality system 300 at space 400B. The course profile constructed for course 420A may be used by a virtual reality system at space 420B to generate a virtual environment corresponding to course 420A. The virtual environment generated for space 400B may include virtual course elements 410B corresponding to course elements 410A, as well as any other visual elements generated in the virtual environment of space 400A.

Space 400B may have different dimensions from space 400A, however. As such, the virtual environment generated for space 400A needs to be scaled for the dimensions of space 400B. In some instances, scaling may also occur based on the dimensions of the UAV 100B in space 400B. Such scaling may be based on the relative differences in dimensions between spaces 400A and 400B, the relative differences in dimensions between UAV 100A and 100B, and various other characteristics of the respective spaces or UAVs. In some implementations, such as competitions, scaling may also apply to scores, points, times, or other metric used to compare performance between a UAV 100A in a first space 400A and another UAV 100B in a second space 400B.

Figure 5:
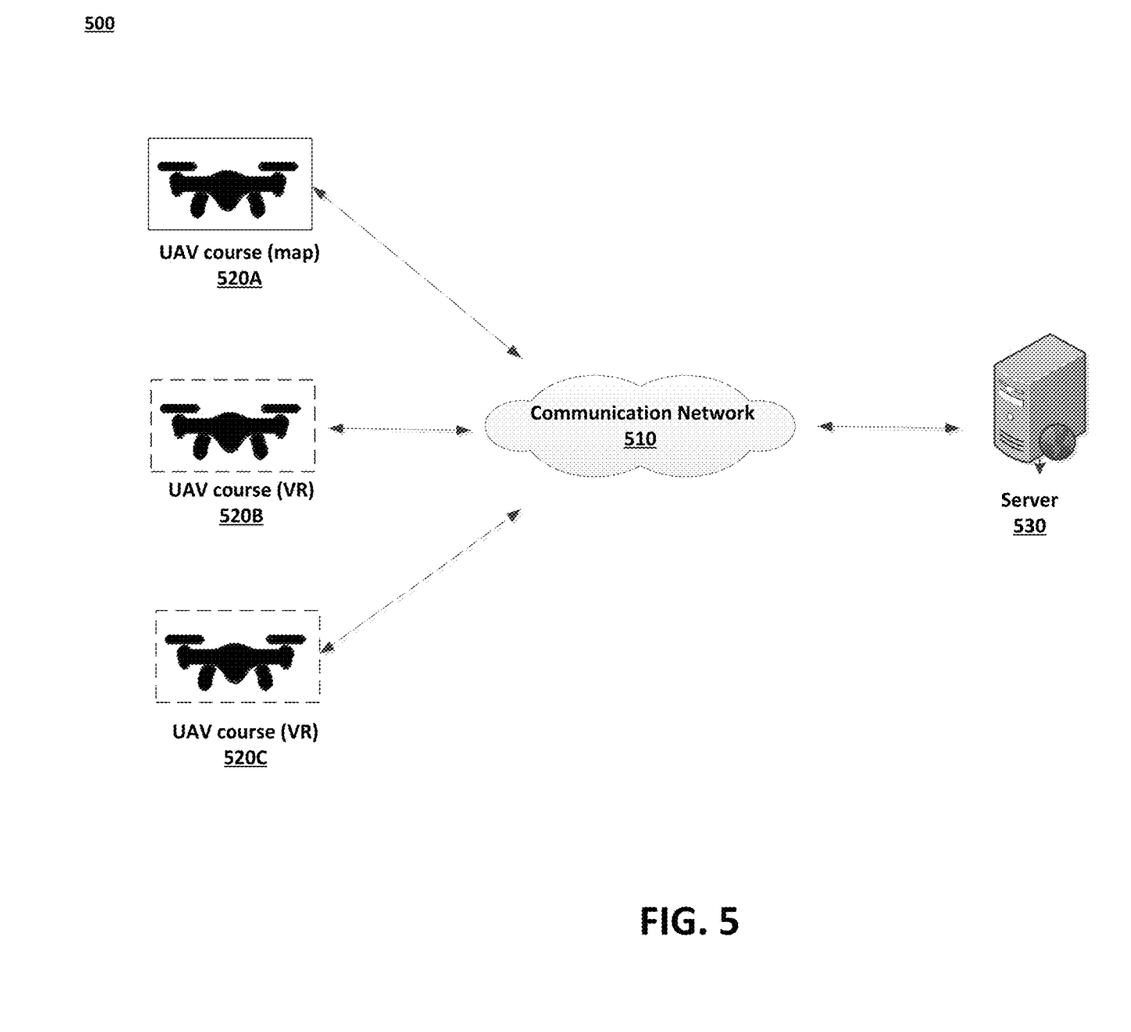
FIG. 5 is a flowchart illustrating an exemplary method for UAV course profiling and sharing.

FIG. 5 is an exemplary network environment 500 in which a system for UAV course profiling and sharing may be implemented. Network environment 500 may include a communication network 510 through which communications between various UAV courses 520A-C (each with a respective virtual reality system) and server 530 may occur.

Communication network 510 may be a local, proprietary network (e.g., an intranet) and/or may be a part of a larger wide-area network. The communications network 510 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 510 allows for communication between the various components of network environment 500.

UAV courses 520A-C represent different spaces at different locations. Each UAV course 520C-C may be associated with a respective UAV and virtual reality system. The type of UAVs and virtual reality system at each UAV course 520C-C may also differ. In an exemplary implementation, a course may be mapped and profiled at a first UAV course 520A. Such a course profile may include not only information regarding the physical space at UAV course 520A, but also any virtual objects or features thereof. In some instances, the course profile may also include information regarding the UAV used to map and profile the course at UAV course 520A.

The course profile for UAV course 520A may be sent over communication network 510 to any of the other UAV courses 520B-C or to server 530. The respective virtual reality systems at each of the other UAV courses 520B-C may generate a virtual environment corresponding to the course mapped for UAV course 520A. Where the dimensions of the space or UAV may differ, various scaling factors may be used to generate the respective virtual environments at UAV courses 520B-C. In some embodiments, the course profile may be sent to server 530 for storage and distribution.

Server 530 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

In some embodiments, server 530 may act as a storage repository for course profiles for different UAV courses. Users who create course profiles by flying their UAV and augmenting or adding virtual objects to the same may further provide the course profiles to server 530. Such course profiles may be made accessible or distributed to other users upon request. In some embodiments, server 530 may apply various scaling and normalization factors so that a virtual UAV course may be generated in spaces having different dimensions.

Server 530 may be a game server or other type of host server capable of hosting a session that includes one or more systems (e.g., UAV courses 520A-C). For example, the server 530 may manage a competition in which a user at each course 520A-C may fly a UAV through a virtual course. Various scores, points, or times may be recorded, as well as scaled or otherwise normalized to account for differences in degree of difficulty related to the differences between the UAV courses and respective UAVs.

Figure 6:
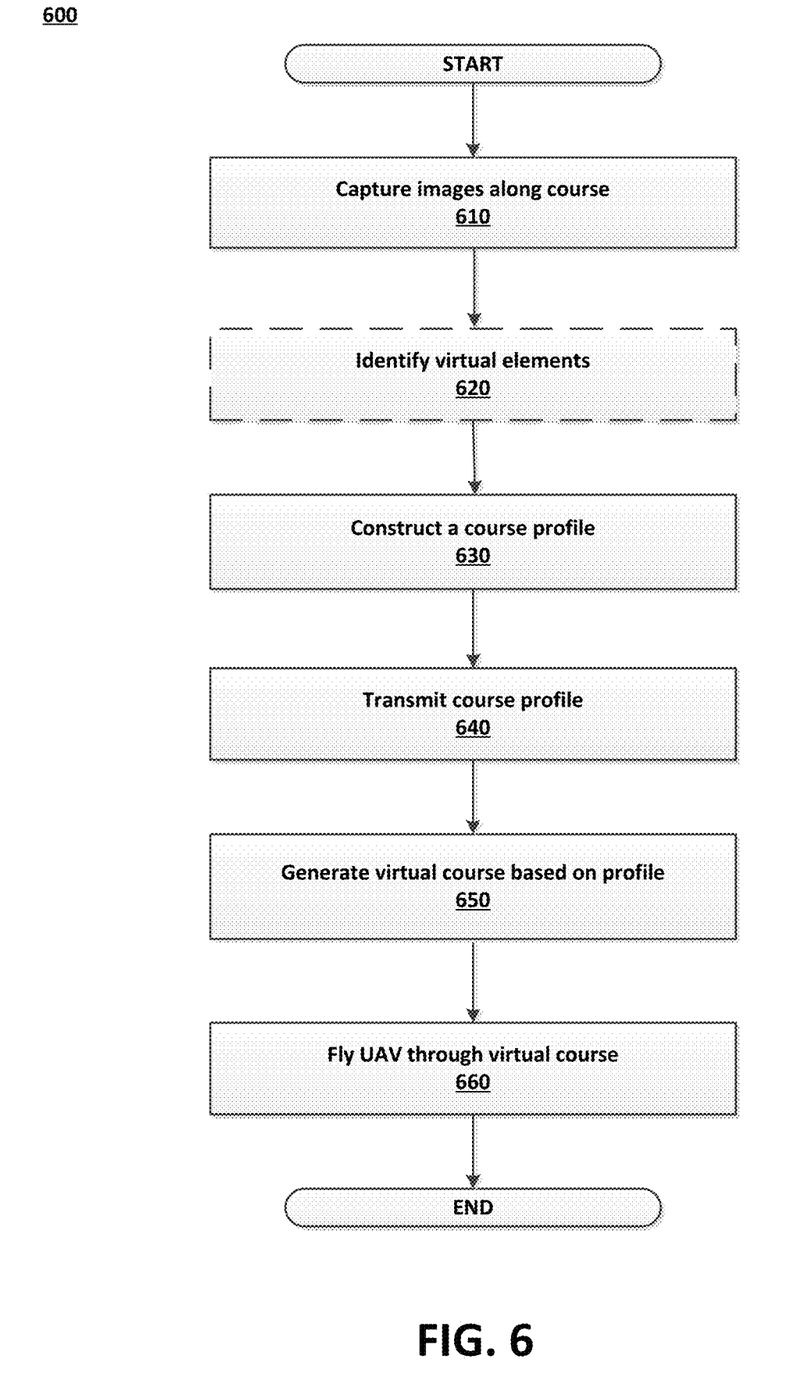
FIG. 6 is a flowchart illustrating an exemplary method for using a shared UAV course profile.

FIG. 6 is a flowchart illustrating an exemplary method 600 for using a shared UAV course profile. The method 600 of FIG. 6 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 6 (and the order thereof) are exemplary and may include various alternatives, equivalents, or derivations thereof including but not limited to the order of execution of the same.

In step 610, images and other data are captured as a UAV is flown along a course at a first location. As discussed above, the UAV may be equipped with various cameras, position sensors, gimbals, environmental sensors, radar, lidar, lasers, and other types of sensors that not only allow for tracking of the UAV movement, but also gather data regarding the environment (e.g., obstacles, objects) through which the UAV moves.

In step 620, virtual elements may be added to the course. Such virtual elements may include augmentation of physical objects or wholly virtual elements. The addition of virtual elements may be based on user preference or selection. In some embodiments, the user may be offered a menu of virtual elements, themes, or templates that may be used to augment or add to a particular course.

In step 630, a course profile may be constructed based on the information captured in step 610, as well as the customizations added in step 620. The course profile may include mapping data of the course, as well as various physical and virtual elements on the course. Such a course profile may further specify sizes, distances, and other measurements of various elements of the course, as well as information regarding the UAV used to map the course.

In step 640, the course profile may be transmitted over a communication network to other virtual reality systems or servers. Such transmission may occur upon request, automatic sharing or distribution settings, or other parameters selected by users or administrators.

In step 650, a virtual reality system (e.g., at a second location) that received the course profile may generate a virtual environment that is based upon the course profile and that includes a course corresponding to the mapped course. Depending on the differences in the available space at the locations and differences in the UAV, various scaling or normalization factors may be used to generate a virtual environment (including the virtual course and course elements) at the second location.

In step 660, a user in the second location may fly their UAV along the virtual course. In some embodiments, multiple virtual courses may be generated at different locations, and UAVs flown along the respective courses may be essentially racing against each other, albeit in different locations. Further, the respective virtual reality systems may communicate with each other to provide the real-time locations of each respective UAV along the course. As such, the user may view a virtual representation of their UAV competitors in the virtual environment, as well as various interactions that may occur between the physical UAV present at a location and virtual UAVs representing UAVs at other locations. Such interactions may result in various parameters being applied to the physical UAV. For example, a bump with a virtual UAV may result in limitations on the power or acceleration made available to the physical UAV.

Figure 7:
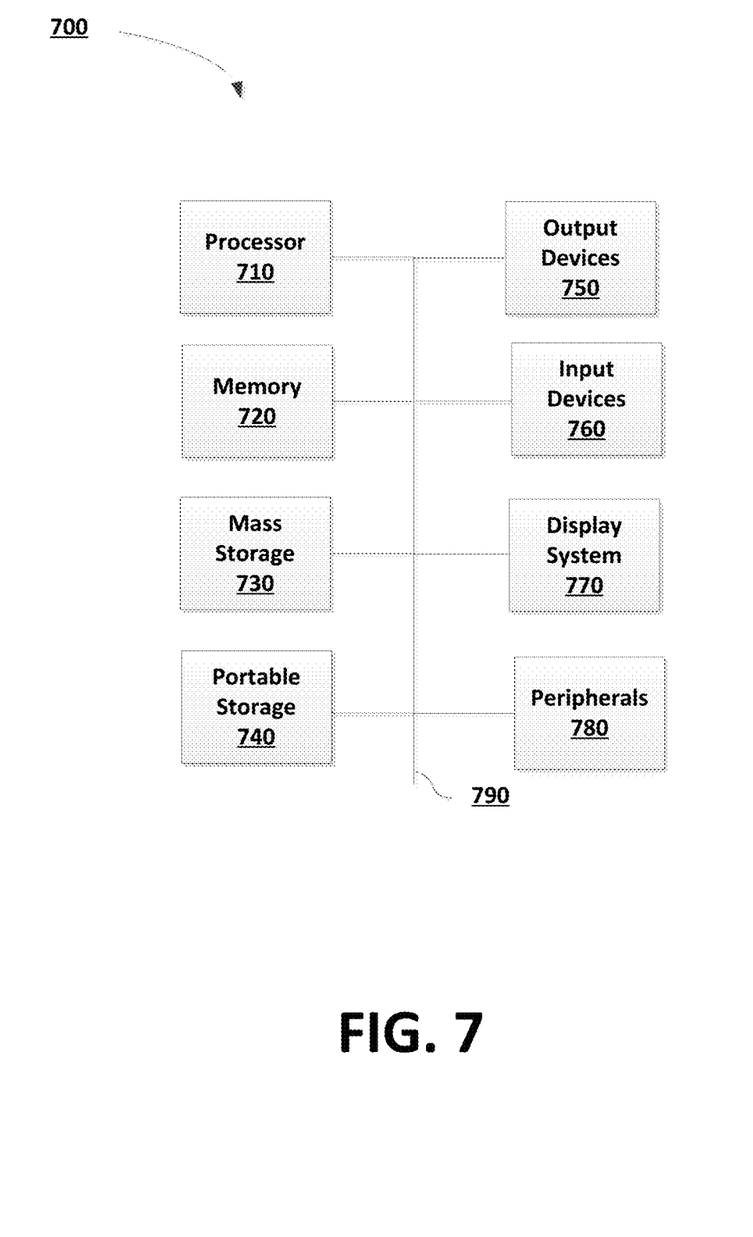
FIG. 7 is a block diagram of an exemplary computing device that may be used to implement an embodiment of the present invention.

FIG. 7 is a block diagram of an exemplary computing system 700 that may be used to implement an embodiment of the present invention. Computing system 700 may be inclusive of general purpose computers, mobile phones, smartphones, personal digital assistants (PDAs), portable computing devices (e.g., laptop, netbook, tablets), desktop computing devices, handheld computing device, game console, or any other type of computing device known in the art.

The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 8:
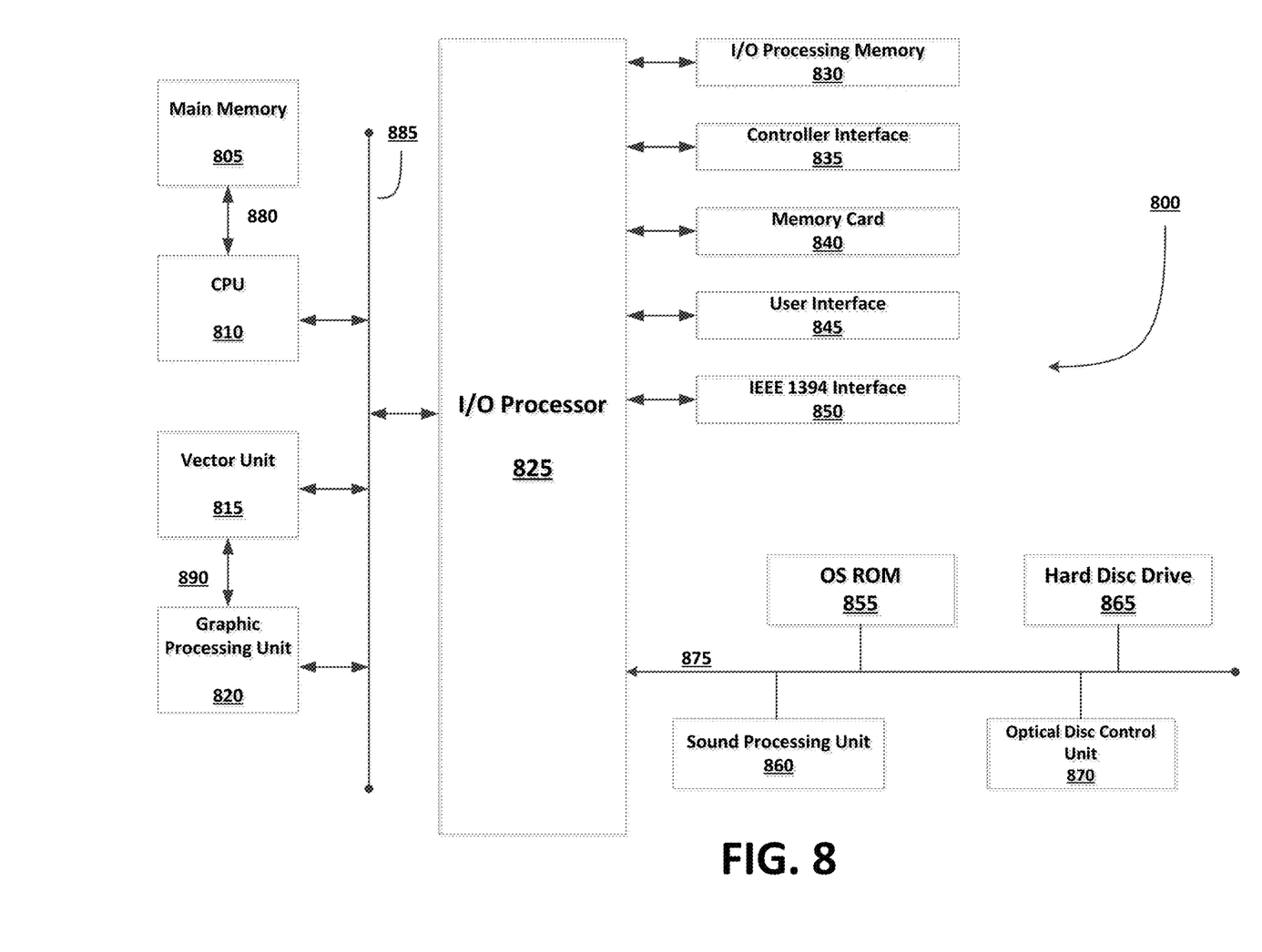
FIG. 8 is an exemplary electronic entertainment system that may be used in implementing UAV course profiling and sharing.

FIG. 8 is a block diagram of an exemplary electronic entertainment system 800. The entertainment system 800 of FIG. 8 includes a main memory 805, a central processing unit (CPU) 810, vector unit 815, a graphics processing unit 820, an input/output (I/O) processor 825, an I/O processor memory 830, a controller interface 835, a memory card 840, a Universal Serial Bus (USB) interface 845, and an IEEE 1394 interface 850. The entertainment system 800 further includes an operating system read-only memory (OS ROM) 855, a sound processing unit 860, an optical disc control unit 870, and a hard disc drive 865, which are connected via a bus 875 to the I/O processor 825.

Entertainment system 800 may be an electronic game console. Alternatively, the entertainment system 800 may be implemented as a general-purpose computer, a set-top box, a hand-held game device, a tablet computing device, or a mobile computing device or phone. Entertainment systems may contain more or less operating components depending on a particular form factor, purpose, or design.

The CPU 810, the vector unit 815, the graphics processing unit 820, and the I/O processor 825 of FIG. 8 communicate via a system bus 885. Further, the CPU 810 of FIG. 8 communicates with the main memory 805 via a dedicated bus 880, while the vector unit 815 and the graphics processing unit 820 may communicate through a dedicated bus 890. The CPU 810 of FIG. 8 executes programs stored in the OS ROM 855 and the main memory 805. The main memory 805 of FIG. 8 may contain pre-stored programs and programs transferred through the I/O Processor 825 from a CD-ROM, DVD-ROM, or other optical disc (not shown) using the optical disc control unit 870. I/O Processor 825 of FIG. 8 may also allow for the introduction of content transferred over a wireless or other communications network (e.g., 4$, LTE, 3G, and so forth). The I/O processor 825 of FIG. 8 primarily controls data exchanges between the various devices of the entertainment system 800 including the CPU 810, the vector unit 815, the graphics processing unit 820, and the controller interface 835.

The graphics processing unit 820 of FIG. 8 executes graphics instructions received from the CPU 810 and the vector unit 815 to produce images for display on a display device (not shown). For example, the vector unit 815 of FIG. 8 may transform objects from three-dimensional coordinates to two-dimensional coordinates, and send the two-dimensional coordinates to the graphics processing unit 820. Furthermore, the sound processing unit 860 executes instructions to produce sound signals that are outputted to an audio device such as speakers (not shown). Other devices may be connected to the entertainment system 800 via the USB interface 845, and the IEEE 1394 interface 850 such as wireless transceivers, which may also be embedded in the system 800 or as a part of some other component such as a processor.

A user of the entertainment system 800 of FIG. 8 provides instructions via the controller interface 835 to the CPU 810. For example, the user may instruct the CPU 810 to store certain game information on the memory card 840 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for profile-based normalization of virtual environments, the system comprising:
   memory that stores a profile that includes data regarding a first physical space, the profile further including one or more virtual elements;
   a processor that executes instructions stored in memory, wherein the processor executes the instructions to apply at least one normalization factor to the profile, the at least one normalization factor corresponding to a different dimension of a second physical space; and
   a virtual reality system at the second physical space, wherein the virtual reality system generates a virtual environment corresponding to the first physical space based on the normalized profile, the virtual environment generated at the second physical space and including the virtual elements included in the profile.

2. The system of claim 1, wherein the profile includes one or more images of the first physical space.

3. The system of claim 1, wherein the virtual elements correspond to one or more physical features of the first physical space, and the virtual reality system generates the virtual elements at the second physical space based on a respective location of the physical features within the first physical space.

4. The system of claim 1, wherein the at least one normalization factor includes at least one scaling factor.

5. The system of claim 1, wherein the processor further applies at least one normalization factor corresponding to another difference between the first physical space and the second physical space, the other difference including at least one of difference in space size, space configuration, player device size, player device maneuverability, and peripheral device availability.

6. The system of claim 1, wherein the processor further applies the at least one normalization factor to a calculation regarding at least one of scoring, timing, and degree of difficulty, wherein performance within the second physical space is evaluated in accordance with the normalized calculation.

7. The system of claim 1, further comprising a server that hosts a session that includes the virtual reality system and at least one other virtual reality system in a third physical space, wherein the other virtual reality system generates a virtual environment corresponding to the first physical space based on the profile as normalized in accordance with a difference between the first physical space and the third physical space.

8. The system of claim 1, wherein the virtual reality system further:
   receives real-time information from at least one other virtual reality system regarding a player device;
   incorporates a representation of the player device within the generated virtual environment; and
   adjusts at least one of the virtual elements within the generated virtual reality environment based on an interaction by the representation within the virtual reality environment.

9. A method for profile-based normalization of virtual environments, the method comprising:
   storing a profile in memory that includes data regarding a first physical space, the profile further including one or more virtual elements;
   executing instructions stored in memory to apply at least one normalization factor to the profile, the at least one normalization factor corresponding to a different dimension of a second physical space; and
   generating a virtual environment corresponding to the first physical space based on the normalized profile, the virtual environment generated at the second physical space and including the virtual elements included in the profile in a virtual reality system at the second physical space.

10. The method of claim 9, wherein the profile includes one or more images of the first physical space.

11. The method of claim 9, wherein the virtual elements correspond to one or more physical features of the first physical space, and wherein generates the virtual elements at the second physical space is based on a respective location of the physical features within the first physical space.

12. The method of claim 9, wherein the at least one normalization factor includes at least one scaling factor.

13. The method of claim 9, further comprising applying at least one normalization factor corresponding to another difference between the first physical space and the second physical space, the other difference including at least one of difference in space size, space configuration, player device size, player device maneuverability, and peripheral device availability.

14. The method of claim 9, further comprising applying the at least one normalization factor to a calculation regarding at least one of scoring, timing, and degree of difficulty, wherein performance within the second physical space is evaluated in accordance with the normalized calculation.

15. The method of claim 14, further comprising hosting a session that includes the virtual reality system and at least one other virtual reality system in a third physical space, wherein the other virtual reality system generates a virtual environment corresponding to the first physical space based on the profile as normalized in accordance with a difference between the first physical space and the third physical space.

16. The method of claim 14, further comprising:
   receiving real-time information from at least one other virtual reality system regarding a player device;
   incorporating a representation of the player device within the generated virtual environment; and
   adjusting at least one of the virtual elements within the generated virtual reality environment based on an interaction by the representation within the virtual reality environment.

17. A non-transitory computer-readable storage medium, having embodied thereon a program executable by a processor to perform a method for profile-based normalization of virtual environments, the method comprising:

storing a profile in memory that includes data regarding a first physical space, the profile further including one or more virtual elements;

executing instructions stored in memory to apply at least one normalization factor to the profile, the at least one normalization factor corresponding to a different dimension of a second physical space; and generating a virtual environment corresponding to the first physical space based on the normalized profile, the virtual environment generated at the second physical space and including the virtual elements included in the profile in a virtual reality system at the second physical space.

\* \* \* \* \*